US008803080B2

(12) United States Patent
Wang et al.

(10) Patent No.: US 8,803,080 B2
(45) Date of Patent: Aug. 12, 2014

(54) SELF CALIBRATION APPROACH FOR MASS SPECTROMETRY (75) Inventors: Yongdong Wang, Wilton, CT (US); Donald Kuehl, Windham, NH (US)

(73) Assignee: Cerno Bioscience LLC, Danbury, CT (US)

( * ) Notice: Subject to any disclaimer, the term of this patent is extended or adjusted under 35 U.S.C. 154(b) by 1019 days.

(21) Appl. No.: 12/602,768

(22) PCT Filed: Jun. 2, 2008

(86) PCT No.: PCT/US2008/065568
§ 371 (c)(1),
(2), (4) Date: Dec. 2, 2009

(87) PCT Pub. No.: WO2008/151153
PCT Pub. Date: Dec. 11, 2008

(65) Prior Publication Data
US 2010/0171032 A1 Jul. 8, 2010

Related U.S. Application Data (60) Provisional application No. 60/941,656, filed on Jun. 2, 2007, provisional application No. 60/956,692, filed on Aug. 18, 2007.

(51) Int. Cl.
*B01D 59/44* (2006.01)
(52) U.S. Cl.
USPC .......................................... 250/282; 250/281
(58) Field of Classification Search
None
See application file for complete search history.

(56) References Cited

U.S. PATENT DOCUMENTS

| | | | | |
|---|---|---|---|---|
| 5,866,907 A * | 2/1999 | Drukier et al. | ................. | 250/366 |
| 6,188,064 B1 * | 2/2001 | Koster | ......... | 250/282 |
| 6,373,052 B1 * | 4/2002 | Hoyes et al. | .................. | 250/287 |
| 6,983,213 B2 * | 1/2006 | Wang | ............... | 702/85 |
| 7,348,553 B2 * | 3/2008 | Wang et al. | .................. | 250/282 |
| 7,451,052 B2 * | 11/2008 | Wang et al. | .................... | 702/85 |
| 7,493,225 B2 * | 2/2009 | Wang et al. | .................... | 702/85 |
| 7,529,629 B2 * | 5/2009 | Wang | .............. | 702/22 |
| 7,577,538 B2 * | 8/2009 | Wang | ............. | 702/85 |
| 7,781,729 B2 * | 8/2010 | Wang et al. | .................. | 250/282 |
| 7,894,650 B2 * | 2/2011 | Weng et al. | .................... | 382/128 |
| 2003/0109990 A1 * | 6/2003 | Axelsson | ......... | 702/27 |
| 2005/0086017 A1 * | 4/2005 | Wang | ............. | 702/85 |
| 2005/0255606 A1 * | 11/2005 | Ahmed et al. | ................ | 436/173 |
| 2006/0169883 A1 * | 8/2006 | Wang et al. | .................. | 250/282 |

(Continued)

FOREIGN PATENT DOCUMENTS

| | | | | |
|---|---|---|---|---|
| WO | WO 2006050226 A2 * | 5/2006 | ............. | H01J 49/00 |
| WO | WO 2006050226 A3 * | 8/2006 | ............. | H01J 49/00 |

*Primary Examiner* — Andrew Smyth (57) ABSTRACT

Methods for analyzing mass spectral data, include acquiring profile mode mass spectral data containing at least on ion of interest whose elemental composition is determined; obtaining a correct peak shape function based on the actually measured peak shape of at least one of the isotypes of the same ion of interest; generating at least one possible elemental composition for the ion of interest; calculating a theoretical isotope distribution for the elemental composition and a theoretical isotope cluster by applying correct peak shape function to the theoretical isotope distribution; comparing quantiatively the corresponding parts of the theoretical isotope cluster to that from acquired profile mode mass spectral data to obtain at least one of elemental composition determination, classification, or quantitation for the ion. A computer for and a computer readable medium having computer readable code thereon for performing the methods. A mass spectrometer having an associated computer for performing the methods.

23 Claims, 4 Drawing Sheets

(56) References Cited

U.S. PATENT DOCUMENTS

| | | | |
|---|---|---|---|
| 2006/0217911 A1* | 9/2006 | Wang | 702/85 |
| 2006/0255258 A1* | 11/2006 | Wang et al. | 250/282 |
| 2006/0288339 A1* | 12/2006 | Wang | 717/155 |
| 2007/0023633 A1* | 2/2007 | Wang et al. | 250/282 |
| 2007/0095757 A1* | 5/2007 | Kaplan et al. | 210/656 |
| 2007/0136017 A1* | 6/2007 | Wang et al. | 702/85 |
| 2007/0211928 A1* | 9/2007 | Weng et al. | 382/128 |
| 2008/0001079 A1* | 1/2008 | Wang et al. | 250/282 |
| 2009/0076737 A1* | 3/2009 | Wang et al. | 702/23 |
| 2009/0104603 A1* | 4/2009 | Satomaa et al. | 435/6 |
| 2009/0117106 A1* | 5/2009 | Satomaa et al. | 424/133.1 |
| 2009/0162938 A1* | 6/2009 | Laine et al. | 436/63 |
| 2009/0321626 A1* | 12/2009 | Vertes et al. | 250/282 |
| 2010/0055710 A1* | 3/2010 | Satomaa et al. | 435/7.1 |

* cited by examiner

| 10 ppm Search window | | | 100 ppm search window | | |
|---|---|---|---|---|---|
| Row | Formula | Spectral Accuracy | Row | Formula | Spectral Accuracy |
| 1 | C25H23N2OS | 99.1262 | 1 | C25H23N2OS | 99.1262 |
| 2 | C28H19N2O | 99.082 | 2 | C28H19N2O | 99.082 |
| 3 | C22H27N2OS2 | 98.9577 | 3 | C27H19N4 | 99.0384 |
| 4 | C20H23N4O3S | 98.8946 | 4 | C26H23O4 | 99.0293 |
| 5 | C21H23N2O6 | 98.8072 | 5 | C24H23N4S | 99.0172 |
| 6 | C18H15N12 | 98.73 | 6 | C26H23O2S | 98.9957 |
| 7 | C17H27N4O3S2 | 98.7131 | 7 | C23H27O4S | 98.9738 |
| 8 | C17H19N8O4 | 98.6294 | 8 | C22H27N2OS2 | 98.9577 |
| 9 | C16H31O7S2 | 98.5581 | 9 | C23H27O2S2 | 98.9304 |
| 10 | C14H23N8O4S | 98.5565 | 10 | C23H19N4O3 | 98.8981 |

FIG. 4

SELF CALIBRATION APPROACH FOR MASS SPECTROMETRY

This application claims priority, under 35 U.S.C. §119(e), from provisional patent applications Ser. No. 60/941,656 filed on Jun. 2, 2007 and 60/956,692 filed on Aug. 18, 2007. The entire contents of these applications are incorporated herein, in their entireties.

CROSS REFERENCE TO RELATED PATENT APPLICATIONS/PATENTS

The entire contents of the following documents are incorporated herein by reference in their entireties:
U.S. Pat. No. 6,983,213; International Patent Application PCT/US2004/013096, filed on Apr. 28, 2004; U.S. patent application Ser. No. 11/261,440, filed on Oct. 28, 2005; International Patent Application PCT/US2005/039186, filed on Oct. 28, 2005; International Patent Application PCT/US2006/013723, filed on Apr. 11, 2006; U.S. patent application Ser. No. 11/754,305, filed on May 27, 2007; International Patent Application PCT/US2007/069832, filed on May 28, 2007. U.S. patent application Ser. No. 11/830,772 which was filed on Jul. 30, 2007 and which claims priority from provisional patent application Ser. No. 60/833,862 filed on Jul. 29, 2006.

BACKGROUND OF THE INVENTION

1. Field of the Invention

The present invention relates to mass spectrometry systems. More particularly, it relates to mass spectrometry systems that are useful for the analysis and determination of molecules, including large and small organic molecules such as proteins or peptides, environmental pollutants, pharmaceuticals and their metabolites or degradants or impurities, food ingredients, flavor compounds, and petrochemical compounds etc., to methods of analysis used therein, and to a computer program product having computer code embodied therein for causing a computer, or a computer and a mass spectrometer in combination, to affect such analysis.

2. Prior Art

In drug metabolism studies, researchers typically create a radio-labeled version of the parent drug before dosing the drug with animal or human test subjects. Through biotransformations, the drug will be transformed into its metabolites, between just a few to as many as 50-70 metabolites. By detecting and following the radio-activity, researchers can trace these bio transformations and account for the metabolites. The sample is typically injected into an LC/MS system for analysis, where various metabolites will be separated in (retention) time and detected by mass spectrometry. While these metabolites can be traced by a radio activity detector in a split flow arrangement in parallel to mass spectrometry, the identification of these metabolites will have to rely on mass spectrometry due to its mass (m/z) measuring capability. Unfortunately in many cases, the biological sample, even after extensive clean-up, sample preparation, and LC separation, still suffers from significant matrix or background ion interferences, making metabolite identification a time-consuming and tedious process. To help with the mass spectral identification of possible metabolites, researchers may dose test subjects with a mixture of the native and radio-labeled compound, creating a unique mass spectral signature that is easier for researchers to spot in a mass spectrum. Subject to limitations on total dosage, radio-activity exposure for a given test species, mass spectral saturation, and the uncertainty surrounding the ratio between the native and the radio-labeled version of the drug, metabolite identification remains a daunting task for researchers, even with the aid of radio activity tracing.

After an ion has been possibly identified to be drug-related, it is typically required then to confirm its elemental composition before structural elucidation through further MS/MS experimentation or even isolation for NMR analysis. Due to the various backgrounds present, typically, higher resolution mass spectrometry is desired in order to avoid the interference from the matrix or background ions. Higher resolution mass spectrometry systems such as TOF, qTOF, Orbitrap, or FT ICR MS, offer two distinct advantages: less spectral interferences and higher mass accuracy. With elaborate calibration schemes such as lock mass, dual spray, and internal calibration, obtaining unique elemental composition remains a challenge even at the extremely high mass accuracy of 100 ppb.

A previous approach, as in U.S. Pat. No. 6,983,213 and International Patent Application PCT/US2005/039186, filed on Oct. 28, 2005, provides a novel method for calibrating mass spectral data to much improved mass accuracy with line shape transformation so as to enable or enhance elemental composition determination. Very high mass accuracy can be obtained on so-called unit mass resolution systems in accordance with the techniques taught in U.S. Pat. No. 6,983,213. Combined with peak shape transformation, this makes it feasible to perform elemental composition determination on even a single quadrupole mass spectrometer system. This accurate line shape calibration provides an additional metric to assist in the unambiguous formula identification by allowing for exact matching between a measured and a theoretically calculated mass spectrum for a given candidate formula, as disclosed in International Patent Application PCT/US2005/039186, filed on Oct. 28, 2005.

In spite of these later developments, obtaining unique elemental composition from even high resolution mass spectrometry systems remains a challenge to practitioners of mass spectrometry, due to the tedious calibration process involved which requires either internal or external calibration standards be measured at a time and m/z values close to those of the unknown ions.

Thus, there exists a significant gap between what the current mass spectral system can offer and what is being achieved at the present using existing technologies for mass spectral analysis.

SUMMARY OF THE INVENTION

It is an object of the invention to provide a mass spectrometry system and a method for operating a mass spectrometry system that overcomes the disadvantages described above, in accordance with the methods described herein.

It is another object of the invention to provide a storage media having thereon computer readable program code for causing a mass spectrometry system to perform the method in accordance with the invention.

An additional aspect of the invention is, in general, a computer readable medium having thereon computer readable code for use with a mass spectrometer system having a data analysis portion including a computer, the computer readable code being for causing the computer to analyze data by performing the methods described herein. The computer readable medium preferably further comprises computer readable code for causing the computer to perform at least one of the specific methods described.

Of particular significance, the invention is also directed generally to a mass spectrometer system for analyzing chemical composition, the system including a mass spectrometer portion, and a data analysis system, the data analysis system operating by obtaining calibrated continuum spectral data by processing raw spectral data; generally in accordance with the methods described herein. The data analysis portion may be configured to operate in accordance with the specifics of these methods. Preferably the mass spectrometer system further comprises a sample preparation portion for preparing samples to be analyzed, and a sample separation portion for performing an initial separation of samples to be analyzed. The separation portion may comprise at least one of an electrophoresis apparatus, a chemical affinity chip, or a chromatograph for separating the sample into various components.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
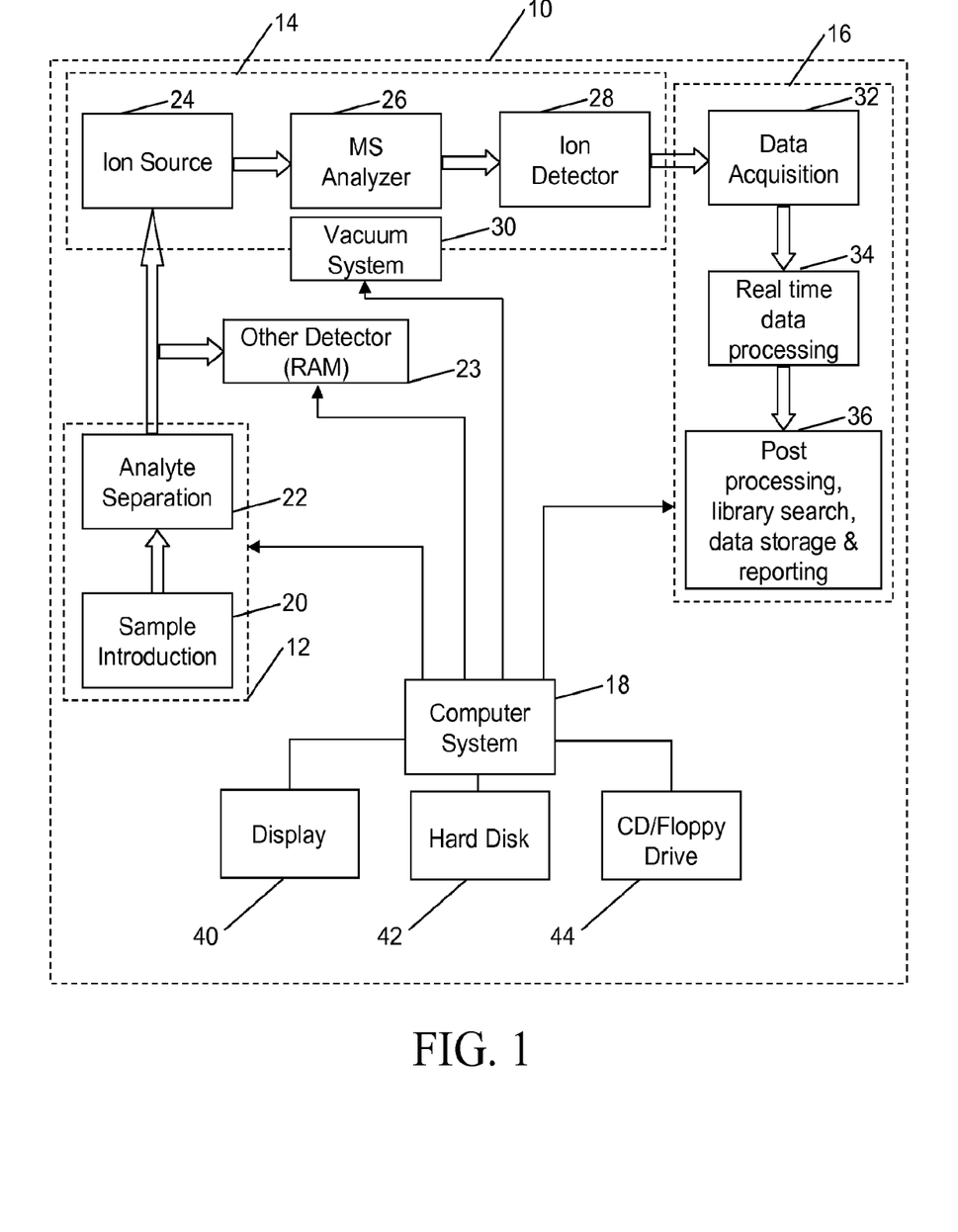
FIG. 1 is a block diagram of a mass spectrometer in accordance with the invention.

Referring to FIG. 1, there is shown a block diagram of an analysis system 10, that may be used to analyze proteins or other molecules, as noted above, incorporating features of the present invention. Although the present invention will be described with reference to the single embodiment shown in the drawings, it should be understood that the present invention can be embodied in many alternate forms of embodiments. In addition, any suitable types of components could be used.

Analysis system 10 has a sample preparation portion 12, other detector portion 23, a mass spectrometer portion 14, a data analysis system 16, and a computer system 18. The sample preparation portion 12 may include a sample introduction unit 20, of the type that introduces a sample containing proteins, peptides, or small molecules of interest to system 10, such as Finnegan LCQ Deca XP Max, manufactured by ThermoFisher Scientific Corporation of Waltham, Mass., USA. The sample preparation portion 12 may also include an analyte separation unit 22, which is used to perform a preliminary separation of analytes, such as the proteins to be analyzed by system 10. Analyte separation unit 22 may be any one of a chromatography column, an electrophoresis separation unit, such as a gel-based separation unit manufactured by Bio-Rad Laboratories, Inc. of Hercules, Calif., and is well known in the art. In general, a voltage is applied to the unit to cause the proteins to be separated as a function of one or more variables, such as migration speed through a capillary tube, isoelectric focusing point (Hannesh, S. M., *Electrophoresis* 21, 1202-1209 (2000), or by mass (one dimensional separation)) or by more than one of these variables such as by isoelectric focusing and by mass. An example of the latter is known as two-dimensional electrophoresis.

The mass spectrometer portion 14 may be a conventional mass spectrometer and may be any one available, but is preferably one of MALDI-TOF, quadrupole MS, ion trap MS, qTOF, TOF/TOF, or FTMS. If it has a MALDI or electrospray ionization ion source, such ion source may also provide for sample input to the mass spectrometer portion 14. In general, mass spectrometer portion 14 may include an ion source 24, a mass analyzer 26 for separating ions generated by ion source 24 by mass to charge ratio, an ion detector portion 28 for detecting the ions from mass analyzer 26, and a vacuum system 30 for maintaining a sufficient vacuum for mass spectrometer portion 14 to operate efficiently. If mass spectrometer portion 14 is an ion mobility spectrometer, generally no vacuum system is needed and the data generated are typically called a plasmagram instead of a mass spectrum.

In parallel to the mass spectrometer portion 14, there may be other detector portion 23, where a portion of the flow is diverted to for nearly parallel detection of the sample in a split flow arrangement. This other detector portion 23 may be a single channel UV detector, a multi-channel UV spectrometer, or Reflective Index (RI) detector, light scattering detector, radioactivity monitor (RAM) etc. RAM is most widely used in drug metabolism research for $^{14}$C-labeled experiments where the various metabolites can be traced in near real time and correlated to the mass spectral scans. The other detector portion 23 can also be arranged in a serial manner as a flow-through detection prior to the mass spectrometer portion 14.

The data analysis system 16 includes a data acquisition portion 32, which may include one or a series of analog to digital converters (not shown) for converting signals from ion detector portion 28 into digital data. This digital data is provided to a real time data processing portion 34, which processes the digital data through operations such as summing and/or averaging. A post processing portion 36 may be used to do additional processing of the data from real time data processing portion 34, including library searches, data storage and data reporting.

Computer system 18 provides control of sample preparation portion 12, mass spectrometer portion 14, other detector portion 23, and data analysis system 16, in the manner described below. Computer system 18 may have a conventional computer monitor or display 40 to allow for the entry of data on appropriate screen displays, and for the display of the results of the analyses performed. Computer system 18 may be based on any appropriate personal computer, operating for example with a Windows® or UNIX® operating system, or any other appropriate operating system. Computer system 18 will typically have a hard drive 42, or other type of data storage medium such as memory stick, on which the operating system and the program for performing the data analysis described below is stored. A removable data storage device 44 for accepting a CD, floppy disk, memory stick or other data storage medium is used to load the program in accordance with the invention on to computer system 18. The program for controlling sample preparation portion 12 and mass spectrometer portion 14 will typically be downloaded as firmware for these portions of system 10. Data analysis system 16 may be a program written to implement the processing steps discussed below, in any of several programming languages such as C++, JAVA or Visual Basic.

When it comes to elemental composition determination such as in metabolite identification application described above, mass spectrometry with high mass accuracy is a powerful tool used for compound ID or validation by virtue of the fact that every unique chemical formula has a unique mass, as referenced in Blaum, K., Physics Reports, Volume 425, Issues 1, March 2006, Pages 1-78. However, even at very high mass accuracy (1-5 ppm) there are still a significant number of formula candidates to consider as all compounds within the mass error window must be considered, which can be a very large number, as referenced in Kind, T. *BMC Bioinformatics* 2006, 7, 234. Traditionally, the list of compound candidates can be reduced by limiting the possible elements and applying other chemical constraints, but the list can still easily contain many tens, if not hundreds or thousands, of compounds. For a given compound (ion), its isotope pattern is also unique even if the individual isotopes and isobars are not fully resolved due to finite resolving power. Simple measurement of the relative intensities of the isotope peaks (M, M+1, M+2, . . . ) can be a useful additional metric for paring down the formula list, particularly for Br- or Cl-containing compounds with their pronounced isotope patterns, as referenced in Kind, T. *BMC Bioinformatics* 2006, 7, 234. Other approaches include simple computer modeling, as referenced in Evans, J. E.; Jurinski, N. B. Anal. Chem. 1975, 47, 961-963b Tenhosaari, A. Org. Mass Spectrom. 1988, 23, 236-239.

Do Lago, C. L.; Kascheres, C. Comput. Chem. 1991, 15, 149-155.

More elaborate approaches have been proposed involving the fitting of Gaussian or other assumed mathematical curves to the isotope distribution in an attempt to model the isotope pattern, as referenced in U.S. Pat. No. 6,188,064. However, all of these approaches are only rough approximations to the true isotope pattern because the actual instrument line shape is either unknown or not available for use, resulting in modeling errors as large as a few percent, the level of error overwhelming the subtle differences from one formula to another, and therefore largely limiting the usefulness of isotope pattern modeling.

Previously established approach in U.S. Pat. No. 6,983,213 has shown a method by which in using a known calibration ion or ions (either just its mono isotopic peak or the entire isotope profile), accurate correction of the instrument line shape to a known mathematical function can be performed while simultaneously calibrating for the mass axis.

The calibration standard can be run either separately for external calibration or included in the unknown run for internal calibration.

As noted above, previous approaches and/or documents including International Patent Application PCT/US2005/039186, filed on Oct. 28, 2005, have also shown that exact accurate isotope modeling can be obtained by matching the calibrated mass spectra to theoretically generated spectra using exactly the same line shape defined from the calibration.

However, it is not always convenient or desirable or just impractical to measure a separate calibration standard to obtain high mass accuracy. Some of these situations include:

For instruments already capable of obtaining relatively high mass accuracy, the small improvement in mass accuracy afforded by this approach requires significant effort compared to the additional specificity obtained for formula identification, for example, improving mass accuracy from 5 to 2 ppm for a compound at 400 Da, containing the possible elements C, H, N, O, S, and F would only reduce the formula count from 110 to 43.

For experiments with significant interferences, such as biological samples where it is difficult or impossible to measure a calibration compound free of interferences through internal calibration, these calibration approaches may be inconvenient to use. In addition, the added internal standards may cause ion suppression and/or mass spectral interferences for the ions of interests.

While external calibration avoids the problem of ion suppression or mass spectral interference, it typically involves a separate data acquisition and therefore inconvenient and time-consuming In addition, external calibration may have to be repeated frequently in order to compensate for time-related mass drifts, as is often the case in TOF instruments. Even with the commercially available new instrumentation that automatically performs internal or external calibration through Lock Spray from Waters in Milford, Mass. or Dual Spray from Agilent Technologies in Santa Clara, Calif., which attempt to address the time consuming part of the frequent calibration required, they are prone to other complications to be described below.

For both internal and external calibration, the selection of calibration standards and their mass locations may pose additional complications, as the calibration masses need to be in the vicinity of the unknown masses.

Another issue in mass spectral calibration is the management of detector dynamic ranges, which is especially important for TOF instruments where it is highly preferred to have both the unknown and the standards at comparable ion intensities in order to avoid systematic mass errors due to ion detector saturation.

Finally, there are certain types of instruments that are inherently limited by physical effects from obtaining high mass accuracy. For example, it is well known that ion-ion field effects (known as space charge effect) limit the intrinsic mass accuracy achievable in ion trap mass spectrometers.

In all of these situations, it would be highly desirable to have the mass spectra calibrated to a known mathematical line shape, without the use of any other ions as standards besides the unknown ion itself. This allows exact isotope modeling of unknown ions for formula identification, even in situations where mass accuracy is significantly relaxed or compromised. Fortunately with higher resolution mass spectral data, this can be achieved by using the resolved monoisotopic peak or any other pure isotopes of the unknown ion itself as a naturally occurring line shape standard. There are many commercially available higher resolution systems that would allow for the resolved isotope to be used to derive the correct peak or line shape function, including TOF, qTOF, Orbitrap, and FT ICR MS. Typically, any mass spectrometer generating better than unit mass resolution data would be applicable. Unit mass resolution may be defined as having resolving power of better than 1,000, or with FWHM at smaller than 0.5 Da for an ion at 500 Da. Therefore, this would also apply to the higher resolution data from quadrupole-based systems capable of scanning at higher than unit mass resolution, such as the Quantum series produced by ThermoFisher in Waltham, Mass., USA. Other examples include ion traps operating at higher resolution mode or sometimes called zoom scan mode, such as the LCQ Classic from ThermoFisher, and magnetic sector based instruments.

Figure 2:
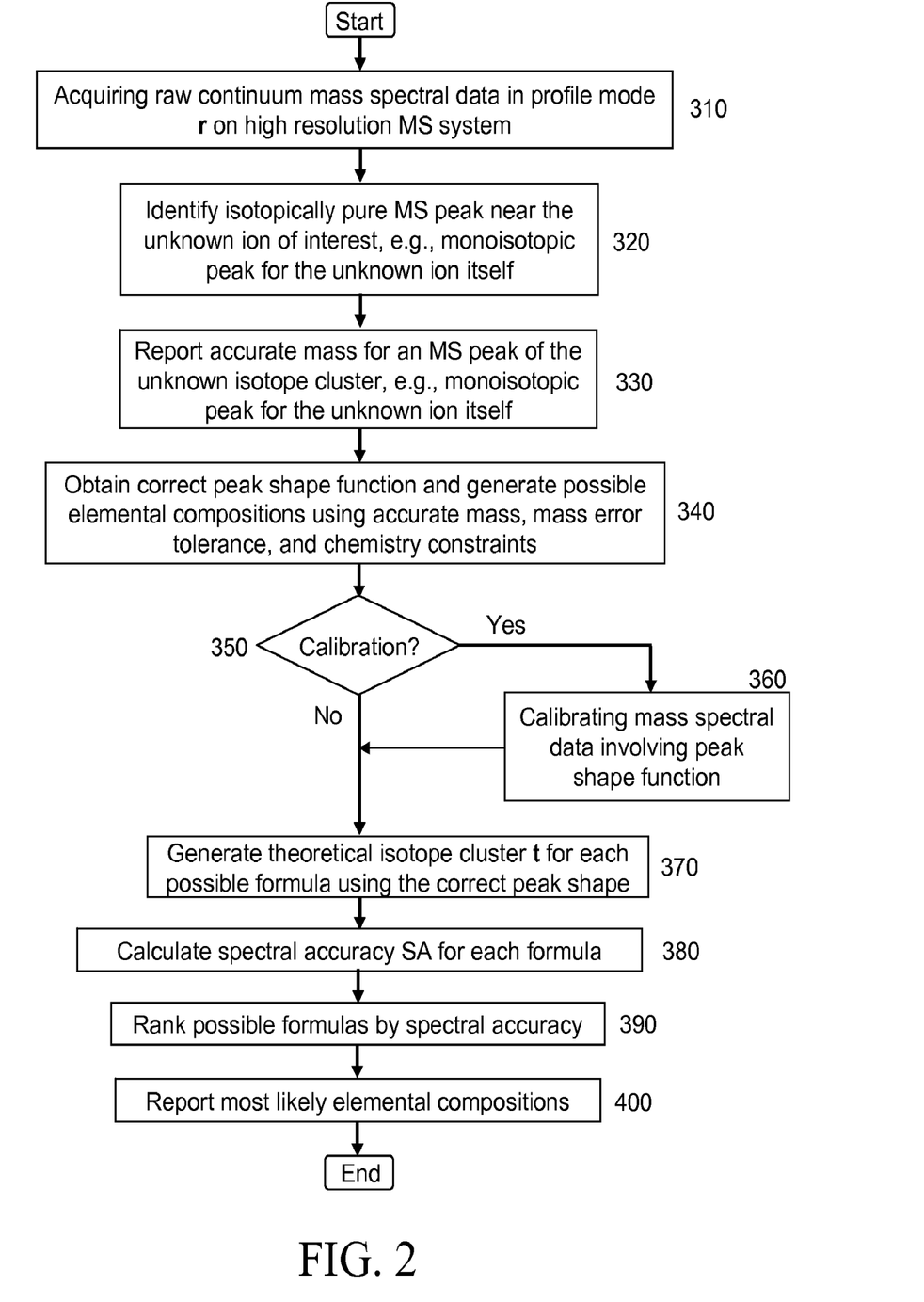
FIG. 2 is a flow chart of the steps in the determination of formulas used by the system of FIG. 1.
Figure 3:
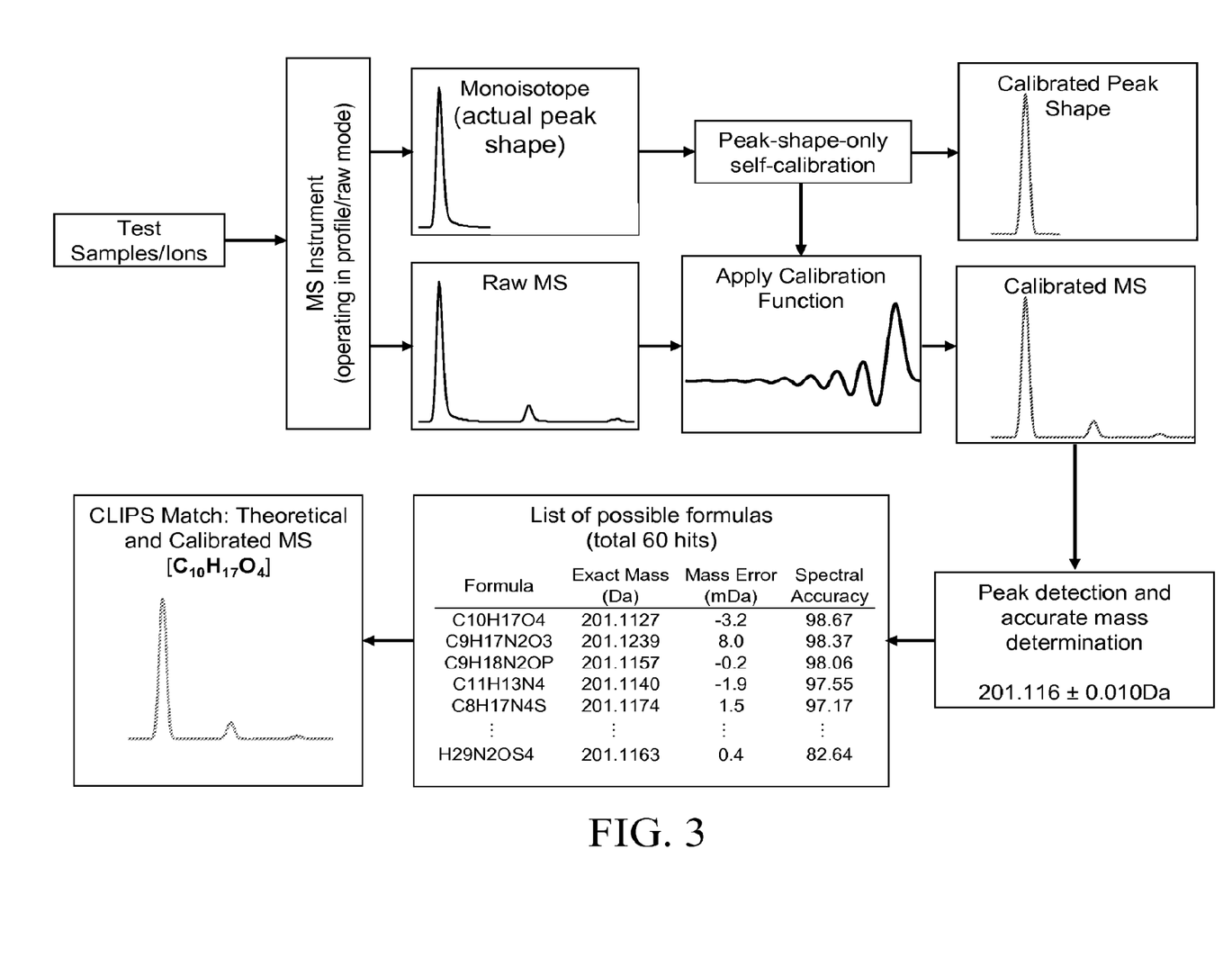
FIG. 3 is a graphical representation of the key steps involved in FIG. 2.

FIG. 2 and FIG. 3 detail a preferred embodiment of this novel self-calibrating approach and its application to formula determination with high resolution mass spectral data. In order for the calibration procedure outlined in U.S. Pat. No. 6,983,213 to work with a single monoisotope peak as a calibration standard, one needs to input the elemental composition for this calibration ion, which may be unknown at the moment. There are several ways to handle this:

1. Obtain an accurate mass reading for the monoisotope peak and perform a formula search in a small mass window and pick any formula candidate as the calibrant. Since only the monoisotope peak will be used in the actual calibration, the actual elemental composition that gives rise to the fine isotope structures starting from M+1 onwards would not impact the calibration.

2. Generate a delta function or stick located precisely at the reported accurate mass location with relative abundance, arbitrarily setting it at 100.00%, representing the complete isotope distribution for this fictional and isotopically pure ion.

Figure 4:
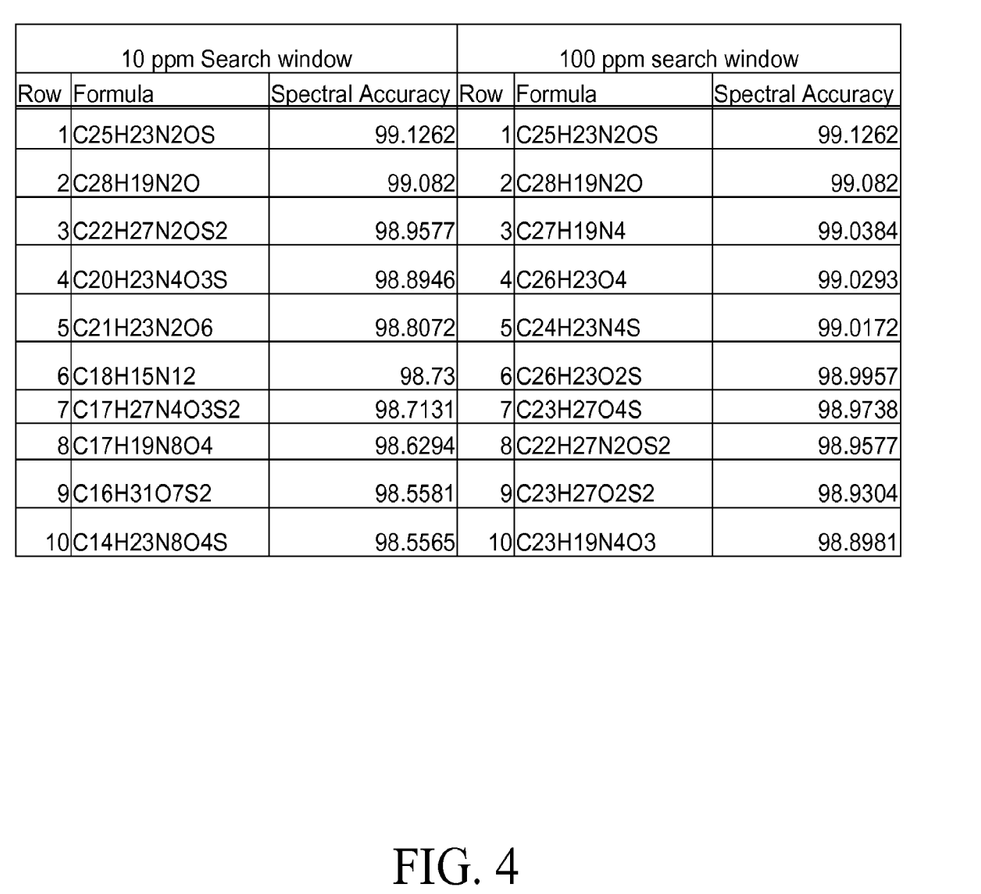
FIG. 4 is a table of possible formulas obtained when searching in two different mass tolerance windows.

When searching for a compound at 399 Da with 10 ppm mass tolerance using C, H, N, O, S and Cl, 116 formula candidates are found. At 100 ppm mass tolerance, 1170 compounds must now be evaluated. Yet, if one calibrates for line shape only and performs an elemental composition search based on the exact isotope modeling, one can easily distinguish and select the same correct formula from the many more possible candidates (see FIG. 4). This reflects the fact that a unique isotope profile exists for a given formula and that subtle differences among similar formulas can be differentiated with exact isotope modeling under the correct line shape.

Another benefit to calibrating to a known mathematical line shape is the possibility of performing highly accurate background interference correction or performing any other mathematical data analysis, including multivariate statistical analysis. Calibrating a complex run, such as from a biological matrix, to a known mathematical line shape will significantly improve the ability to identify the individual components in the mixture via approaches like principle component analysis, and enable further processing, including background subtraction or classification analysis, e.g., for biomarker discovery.

The above line-shape-only calibration can be performed by using the fully resolved mono-isotope peak from the very ion being analyzed as the calibrant in a self calibration process. This is possible because the mono-isotope peak is isotopically pure without any fine isotope structure typical of other isotopes. Because it is pure, it represents the true underlying mass spectral line-shape and can therefore be applied to the entire isotope envelope afterwards.

The process and some typical results are outlined in FIG. 3. The line shape calibrated data can then be used for formula determination through exact isotope modeling, to achieve truly unambiguous formula determination without any additional experimental setup typically required.

Advantages of this self-calibration approach include:
No known calibration compound is required for the calibration
It is known that mass spectral calibration works the best when the calibrant is as close in mass and as close in time to the unknown compound of interest so as to minimize any mass dependence and time-related instrument drift. By definition, this self calibration is as close as one can get in practice.

As depicted in Step 350 in FIG. 2, although it is desirable to have the profile mode data acquired at Step 310 calibrated into a known mathematical line shape through Step 360, this line shape calibration can also be omitted, as long as the same actual line shape is used in all isotope profile calculations. In this case, in Step 370, the theoretical isotope cluster is calculated by using the actual line shape function obtained in Step 340, instead of the desired or target line shape function specified during the optional calibration Step 360. This optional calibration step can be performed using the process as referenced in U.S. Pat. No. 6,983,213. Correspondingly, the calculation of spectral accuracy in Step 380 would be performed either between the raw profile mode mass spectral data and the theoretical isotope cluster with actual peak shape function or between the calibrated profile mode mass spectral data and the theoretical isotope cluster with the desired or target peak shape function, all using the approach disclosed in International Patent Application PCT/US2005/039186, filed on Oct. 28, 2005. The Spectral Accuracy can be calculated as $$SA = \left(1 - \frac{\|e\|_2}{\|r\|_2}\right) \times 100 \quad \text{Equation 1}$$

where r is the profile mode mass spectral data with or without calibration, $\|.\|_2$ represents 2-norm or the square root of the sum of squares of all elements in a vector, and e is the fitting residual between r and the theoretical isotope cluster t calculated in Step 370 in FIG. 2 for a given candidate formula:

$$r = Kc + e \quad \text{Equation 2}$$

where r is an (n×1) matrix of the profile mode mass spectral data, digitized at n m/z values; K is an (n×p) matrix composed of profile mode mass spectral responses for the p components, all sampled at the same n m/z points as r; c is a (p×1) matrix of regression coefficients which are representative of the relative concentrations of p components in matrix K; and e is an (n×1) matrix of a fitting residual with contributions from random noise and any systematic deviations from this model. The p columns of the matrix K will contain the theoretical isotope cluster t and any background or baseline components, which may or may not vary with mass. In the above Equation 2, it should be noted that the vectors r and t can be switched to achieve better computational efficiency, where the matrix K is fixed for all candidate formulas and needs to be inverted only once for the calculation of the Spectral Accuracy metric for all formulas, which requires the estimation of concentration vector c first, $$\hat{c} = K^+ r \quad \text{Equation 3}$$

where $K^+$ is the pseudo inverse of matrix K, a process well established in matrix algebra, as referenced in U.S. Pat. No. 6,983,213; International Patent Application PCT/US2004/013096, filed on Apr. 28, 2004; U.S. patent application Ser. No. 11/261,440, filed on Oct. 28, 2005; International Patent Application PCT/US2005/039186, filed on Oct. 28, 2005; and International Patent Application PCT/US2006/013723, filed on Apr. 11, 2006. $\hat{c}$ is the estimated concentration vector c, which can be inserted back into Equation 2 to estimate the residual vector e as $$\hat{e} = r - K\hat{c} \quad \text{Equation 4}$$

This estimated e can be plugged into Equation 1 for the calculation of Spectral Accuracy for each given candidate formula's theoretical isotope cluster t. Spectral Accuracy (SA) thus calculated will be 100% if the measured isotope profile r reflects that from a theoretically calculated version exactly. In the absence of mass spectral interference or other systematic error such as space charges or detector saturation, typically SA can reach more than 99% easily on many mass spectrometry systems, regardless of mass spectral resolving power.

Optionally, one or more first derivative vectors, corresponding to that of a peak component, a known linear combination of multiple peak components, or the measured mass spectral data r, may be added into the peak components matrix K to account for any relative mass shifts between r and K. This ability to correct for systematic mass shift between measured and theoretical masses can make elemental composition determination more robust and simplify the operation in practice. For example, it is widely practiced in the art of high mass accuracy work for internal standards to be measured along with the unknown ions in order to correct for any small mass drift over time, through infusion, post column injection, alternating or simultaneous lock sprays. Due to the capability of the current invention disclosed herein to compensate for mass drift numerically, through the inclusion of derivative terms, it is now possible to perform elemental composition determination without the use of internal standards, simplifying the tedious process of introducing internal standards and saving valuable measurement time spent on the internal standard ions and any associated contaminations or ion suppressions. Another important and practical application of numerical compensation for mass shift is to avoid space charge effects in ion-trap or FT-ICR cells. In these environments, the mass axis for a given ion can be shifted by a different amount depending on the other ions co-existing in the ion trap or cell and thus may change unpredictably over the course of a chromatographic run where different ions are eluted at different retention times. This well-known effect has plagued ion traps and ICR cells for many years, making elemental composition determination on these instruments a challenge, as it is practically not calibratable. With this invention, however, this varying mass shift can be specifically calculated for each given mass spectrum and compensated for dynamically and accordingly.

As an additional option for numerically compensating mass shift, either the measured mass spectrum r or the theoretically calculated peak components in matrix K can be adjusted with some elaborately added mass shift in a repeated or iterative fashion to minimize the error term e in Equation 4. These deliberate shifts can be used in combination with the above numerical compensation to achieve either more efficient computation or handle larger mass shifts when numerical shift compensation becomes a challenge due to the inaccuracies in Taylor series expansion associated with derivative terms, as pointed out in the cross-referenced U.S. Pat. No. 6,983,213. These additional aspects of the invention will allow for the use of Spectral Accuracy (SA) for elemental composition determination, even in the presence of large mass errors due either to the lack of (frequent) calibration or other instrumental effects such as space charges.

It must be stressed that a key to achieving high spectral accuracy sufficient to differentiate among closely related formulas is the use of either actual peak or line shape (if no peak or line shape calibration is performed), or desired or target line shape, if line shape calibration has been performed. The actual, desired, target, calibrated, or mathematically defined line shape are the "correct line shape" for the corresponding data. In other words, while the data may be calibrated, or processed, such as by filtering, smoothing or baseline correction, or very closely approximated by a series of mathematical functions such as splines or polynomials, to obtain ultimately, the correct peak or line shape, it is based on the actually measured line or peak shape. Thus, the correct peak shape function is essentially unbiased and/or consistent with the actual peak shape function. As well known to those skilled in the art, such processing may involve mathematical, statistical, or numerical manipulations including at least one of smoothing, digital filtering, regression, approximation, fitting, vector operation, matrix operation, convolution, deconvolution, optimization, correlation, autocorrelation, or simple arithmetic operation such as additions or subtractions. In the presence of random noise, the term "correct line shape" refers to an estimation of the true underlying line or peak shape that is unbiased and/or consistent, following the strict statistical definition of these two properties for an estimator.

An estimator $\hat{p}$ of the true line shape function p is unbiased if:

$$E\{\hat{p}\} = p$$

And sufficiently unbiased if $$\|E\{\hat{p}\} - p\|_2 \leq \epsilon \text{ for any } \epsilon > 0$$

taking into consideration computer round-off error, and other system errors etc.

An estimator $\hat{p}$ of the true line shape function p is consistent if:

$$\lim_{n \to \infty} P(\|\hat{p} - p\|_2 \geq \varepsilon) = 0 \text{ for any } \varepsilon > 0$$

as referenced on page 9 in Applied Linear Regression Methods, $2^{nd}$ Ed, 1989 by Neter, John et al.

This differs from any attempt at approximating or assuming some form of line shape, which always carries with it an intrinsic form of statistical bias, resulting in incorrect line shape. Any biased approximation or assumption compromises the attainable Spectral Accuracy and therefore reduce the ability to differentiate closely related formulas, a key objective of this invention. For example, some prior art systems will assume that the peak shape is a Gaussian curve having a full width at half maximum equal to the resolution width of the instrument, regardless of the line shape asymmetry and peak shape tailing generally encountered in mass spectrometry. This use of a single, arbitrary mathematical function is generally not a correct line shape, and compromises Spectral Accuracy.

The process described above includes a fairly comprehensive series of steps, for purposes of illustration, and to be complete. However, there are many ways in which the process may be varied, including leaving out certain steps, or performing certain steps before hand or "off-line". For example, it is possible to follow all the above approaches by including disjoining isotope segments (segments that are not continuous with respect to one another, but have spaces between them in the spectrum), especially with data measured from higher resolution MS systems, so as to avoid the mass spectrally separated interference peaks that are located within, but are not directly overlapped, with the isotope cluster of an ion of interest. Furthermore, one may wish to include only the isotopic peaks that are not overlapped with interferences or not saturated from the detector in the above analysis, using exactly the same vector or matrix algebra during the spectral accuracy calculating Step 380 in FIG. 2. If the disjoining isotope segments pose a mathematical difficulty in terms of derivative calculations, one may consider zero-filling the left out regions in the isotope cluster before the relevant calculations or to leave out the regions with interferences after the derivative calculations. Lastly, one may wish to perform a weighted regression from Equation 1 to 4 to better account for the signal variance, as referenced in U.S. Pat. No. 6,983,213.

In the above descriptions, the monoisotope peak is used most of the time as an example of peak or line shape function due to the fact that it is isotopically pure. For some classes of ions, especially organic ions composed of C and H but with a limited number of N atoms, even the M+1 peak may be considered isotopically pure and used to arrive at the correct peak or line shape function, due to the relatively insignificant contributions from $^{1}H$ and $^{15}N$ when compared to that from $^{13}C$.

For reasons discussed in U.S. Pat. No. 6,983,213; International Patent Application PCT/US2004/013096, filed on Apr. 28, 2004; U.S. patent application Ser. No. 11/261,440, filed on Oct. 28, 2005; International Patent Application PCT/US2005/039186, filed on Oct. 28, 2005; International Patent Application PCT/US2006/013723, filed on Apr. 11, 2006; and U.S. patent application Ser. No. 11/754,305, filed on May 27, 2007; International Patent Application PCT/US2007/069832, filed on May 28, 2007, it is preferred to carry out all above calculations using the profile mode mass spectral data and have the raw profile mode data calibrated for mass and/or peak shape. The above calculations can, however, be carried out in centroid mode, with or without mass or peak shape calibration, with inferior results.

Conversely certain steps may be combined or performed at the same times as other steps. For example, if the mass spectral peak is deemed to be impure and overlapped with other mass spectral peaks in Step 320 in FIG. 2, one may use the same approach outlined to proceed with the elemental composition determination with more than two overlapping ions by effectively augmenting the column in matrix K and corresponding vector c in Equations 2 to 4 (as disclosed in International Patent Application PCT/US2005/039186, filed on Oct. 28, 2005; and International Patent Application PCT/US2006/013723, filed on Apr. 11, 2006). This augmentation effectively extends the concept of spectral accuracy (SA) in Equation 1 to cases with multiple ions or mixtures contained in the mass spectral data vector r.

It is noted that the terms "mass" and "mass to charge ratio" are used somewhat interchangeably in connection with information or output as defined by the mass to charge ratio axis of a mass spectrometer. Similarly, the terms "line shape" and "peak shape" have been used interchangeably in various contexts. This is a common practice in the scientific literature and in scientific discussions, and no ambiguity will occur, when the terms are read in context, by one skilled in the art.

The methods of analysis of the present invention can be realized in hardware, software, or a combination of hardware and software. Any kind of computer system—or other apparatus adapted for carrying out the methods and/or functions described herein—is suitable. A typical combination of hardware and software could be a general purpose computer system with a computer program that, when loaded and executed, controls the computer system, which in turn control an analysis system, such that the system carries out the methods described herein. The present invention can also be embedded in a computer program product, which comprises all the features enabling the implementation of the methods described herein, and which—when loaded in a computer system (which in turn control an analysis system), is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture, which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Thus, it should be understood that the foregoing description is only illustrative of the invention. Various alternatives and modifications can be devised by those skilled in the art without departing from the invention. Other beneficial results can be realized by applying the disclosed invention in a different manner or modifying the invention in ways known to those familiar with the art. Thus, it should be understood that the embodiments has been provided as an example and not as a limitation. Accordingly, the present invention is intended to embrace all alternatives, modifications and variances which fall within the scope of the appended claims.

What is claimed is:

1. A method for analyzing mass spectral data, comprising:
acquiring profile mode mass spectral data containing at least one ion of interest whose elemental composition is to be determined;
obtaining a correct peak shape function based on an actually measured peak shape of at least one isotope of an ion having an elemental composition that is not initially known, where said at least one isotope is one of a baseline resolved monoisotope or other isotope with an insignificant contribution from minor isotopes;
generating at least one possible elemental composition for the at least one ion of interest;
calculating a theoretical isotope distribution for said elemental composition and a theoretical isotope cluster by applying the same correct peak shape function to the theoretical isotope distribution; and
comparing quantitatively the corresponding parts of said theoretical isotope cluster to that from the acquired profile mode mass spectral data to obtain at least one of elemental composition determination, classification, or quantitation for said at least one ion of interest.

2. The method of claim 1, performed with a mass spectrometry system having a resolving power of greater than 1,000 at 500 Da.

3. The method of claim 2, wherein the mass spectrometry system includes at least one of a time-of-flight, quadrupole, ion trap, Fourier Transform (FT), and magnetic sector system.

4. The method of claim 1, wherein the correct peak shape function is one of actual peak shape function as measured and target peak shape function from a mass spectral calibration involving peak shape.

5. The method of claim 1, wherein the acquired profile mode mass spectral data has been calibrated so as to have the correct peak shape function.

6. The method of claim 1, wherein the elemental composition is generated with accurate mass measurement from one of the isotopic masses belonging to the ion of interest within a given mass tolerance window and/or subject to given chemistry constraints.

7. The method of claim 1, wherein the theoretical isotope distribution is calculated from known isotopic abundance of all elements involved in a given elemental composition.

8. The method of claim 1, wherein the theoretical isotope cluster is calculated through convolution between the theoretical isotope distribution and the correct peak shape function.

9. The method of claim 1, wherein the quantitative comparison comprises at least one of a digital filtering, matrix multiplication, matrix inversion, convolution, deconvolution, regression, correlation, fitting, classification, and cluster analysis.

10. The method of claim 1, wherein the quantitative comparison involves at least one of baseline, background, and other known ions in the same mass spectral range.

11. The method of claim 1, wherein the quantitative comparison includes calculating a numerical metric for said elemental composition to measure congruence between said theoretical isotope cluster and that from the acquired profile mode mass spectral data.

12. The method of claim 11, where said numerical metric is utilized as an indication of the likelihood of said elemental composition being the correct formula for the ion of interest.

13. The method of claim 11, wherein the numerical metric is derived from residual error from said quantitative comparison.

14. The method of claim 13, wherein the numerical metric is a spectral accuracy measure calculated as a function of the residual error such that a higher spectral accuracy corresponds to a smaller residual error and hence a higher probability that the corresponding formula is the correct formula.

15. The method of claim 1, wherein the quantitative comparison includes calculating a concentration value for said elemental composition to measure the relative concentration between said theoretical isotope cluster and that from the acquired profile mode mass spectral data.

16. The method of claim 15, where said concentration value is utilized to quantify the absolute concentration of said elemental composition through the use of at least one concentration standard.

17. The method of claim 1, wherein the quantitative comparison takes place after adjusting for a mass shift to at least one of the theoretical isotope cluster and that from the acquired profile mode mass spectral data.

18. The method of claim 17, wherein the mass shift adjustment and quantitative comparison are carried out more than once, or iteratively.

19. The method of claim 1, wherein the correct peak shape is obtained from the actually measured peak shape data through mathematical, statistical, or numerical manipulations including at least one of smoothing, digital filtering, regression, approximation, fitting, regression, vector operation, matrix operation, convolution, deconvolution, optimization, correlation, autocorrelation, or simple arithmetic operations such as addition or subtraction.

20. A computer programmed to perform the method of claim 1.

21. The computer of claim 20, in combination with a mass spectrometer for obtaining mass spectral data to be analyzed by said computer.

22. A computer readable medium having computer readable code thereon for causing a computer to perform the method of claim 1.

23. previously presented A mass spectrometer having associated therewith a computer performing data analysis functions of data produced by the mass spectrometer, the computer performing the method of claim 1.

* * * * *